W. R. HAM.
TELESCOPE.
APPLICATION FILED APR. 15, 1919.
1,339,386. Patented May 11, 1920.
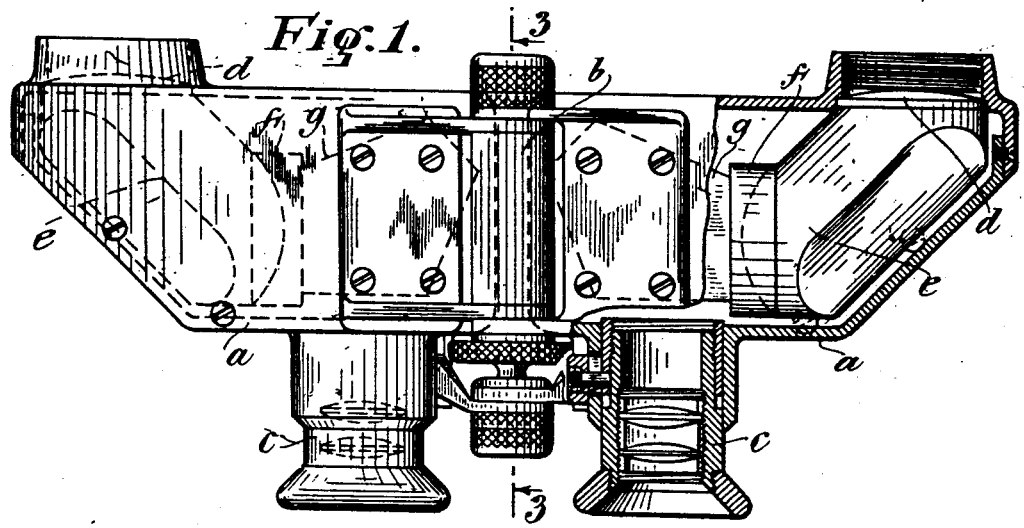
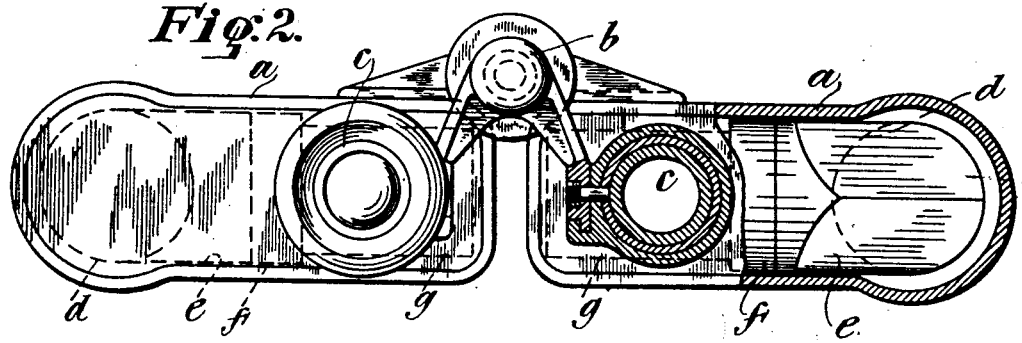
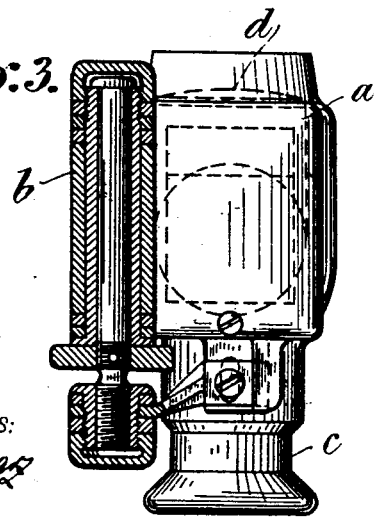
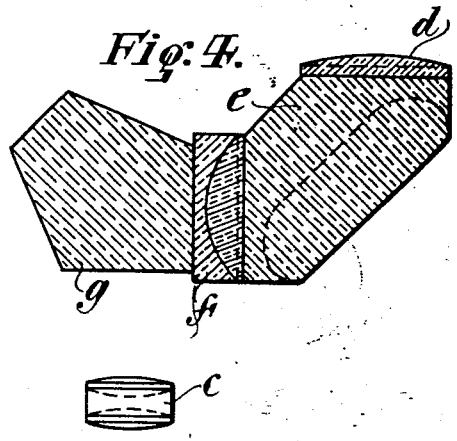
INVENTOR
William R. Ham
BY
Redding & Greeley
ATTORNEYS

UNITED STATES PATENT OFFICE.

WILLIAM R. HAM, OF STATE COLLEGE, PENNSYLVANIA.

TELESCOPE.

1,339,386.   Specification of Letters Patent.   Patented May 11, 1920.

Application filed April 15, 1919. Serial No. 290,212.

*To all whom it may concern:*

Be it known that I, WILLIAM R. HAM, a citizen of the United States, residing in State College, in the State of Pennsylvania, have invented certain new and useful Improvements in Telescopes, of which the following is a specification, reference being had to the accompanying drawings, forming a part hereof.

This invention relates to telescopes in which the reflecting surfaces of prisms are employed to invert the image between the objectives and the eye-piece in order that the image may be seen by the eye in its true position. It has been developed with particular reference to its application to prism binoculars and will be explained herein with reference to such application. The main purpose of the invention is to effect a substantial reduction in the loss of light transmission as compared with telescopes of the same class as heretofore constructed. Ordinary prism binoculars permit the transmission of about 40% of the light which enters the objective. Very high grade instruments give theoretically a light transmission of about 60%, but in actual practice are found to give only about 50%. Telescopes constructed in accordance with the present invention, however, are found to give in actual practice a light transmission of from 65% to 70% and are therefore, by comparison, highly efficient night glasses. Other results incident to the embodiment of the invention are the following:

Absolute rigidity in the relations of all parts of the objective and prism system with consequent non-liability to failure of adjustment in use;

The elimination of inaccessible surfaces on which dust or moisture may collect, so that, even after complete immersion in water, the instrument can be restored quickly to useful condition by the use of a dry cloth;

The substantial correction or the reduction to a minimum effect of slight inaccuracies in the surfaces of lenses or prisms.

The invention will be more fully explained hereinafter with reference to the accompanying drawings, in which—

Figure 1 is a view partly in elevation and partly in longitudinal section of a binocular which embodies the invention.

Fig. 2 is a view of the same in end elevation, with the right hand eye-piece and a portion of the frame or casing in section.

Fig. 3 is a view in section on the plane indicated by the broken line 3—3 of Fig. 1 looking in the direction of the arrows.

Fig. 4 is a detail view of the objective lens and prism system, the frame or casing not being shown.

The invention is illustrated in the drawing as embodied in a prism binocular which has two frames or casings *a, a* hinged together on an axis *b* to permit ready accommodation to varying pupilary distances and provided with eye-pieces *c, c* capable of adjustment together in the usual manner for focusing and capable also in the usual manner of independent adjustment, one with respect to the other, to accommodate lens differences in the eyes of the user. All of these parts may be constructed and arranged in any usual and suitable manner.

The essential feature of the present invention is that all of the components of the objective system and the inverting prism system are cemented together in one unitary system. If this requirement is satisfied the components of the objective system and of the prism system may be variously arranged, any suitable kinds of glass and forms of lenses and prisms being employed. All components of the objective system may be directly associated, but in the embodiment of the invention shown one member or component *d* of the achromatic objective system is shown as applied directly to one end of a roof prism *e*, while the other member or component *f* of the achromatic objective is applied directly to the other end of the roof prism *e* and has applied directly to its outer surface a penta prism *g* from the exit surface of which the light rays pass directly to the eye-piece *c*. This splitting or separation of the objective renders the telescope more highly achromatic. It will be understood that all of the components of the achromatic objective and the prism system are cemented directly together. Canada balsam is preferably employed for the purpose and whatever suitable cement is employed it will, by its presence between the proximate surfaces of adjacent components, not only prevent the formation of reflecting surfaces at such points, but will largely correct or minimize the effect of slight inaccuracies in such surfaces. It will be understood that all exposed surfaces of the components of the system, except the entrance and exit surfaces of the complete system, are suitably coated as usual in optical instruments of this character.

It will be observed that from the entrance end of the complete objective inverting system, to the exit end there are no air-glass interfaces, to reflection on which is due in great part the loss of light in other instruments of this character. Hence the main purpose of the invention is attained and, by comparison, the transmission of light is greatly increased. Furthermore, the entrance and exit surfaces alone being exposed and being themselves readily accessible for cleaning, there are no inaccessible surfaces to become coated with dust or moisture. Again, since all parts of the objective and inverting systems are permanently united, there can be in ordinary use no loss of that exact adjustment of the several parts which is essential to instruments of this character.

I claim as my invention:

In a telescope, the combination of an achromatic objective in two separated parts and an inverting prism system, one part of the prism system being interposed between the two parts of the objective and all of the components of the objective and prism system being directly cemented together.

This specification signed this 10th day of April, A. D. 1919.

WILLIAM R. HAM.